US007296020B2

(12) United States Patent
Gerstl et al.

(10) Patent No.: US 7,296,020 B2
(45) Date of Patent: Nov. 13, 2007

(54) AUTOMATIC EVALUATION OF CATEGORIZATION SYSTEM QUALITY

(75) Inventors: Peter Gerstl, Holzgerlingen (DE); Ulrich Hofmann, Dornbira (AT); Alexander Lang, Stuttgart (DE)

(73) Assignee: International Business Machines Corp, Armonk, NY (US)

( * ) Notice: Subject to any disclaimer, the term of this patent is extended or adjusted under 35 U.S.C. 154(b) by 459 days.

(21) Appl. No.: 10/455,715

(22) Filed: Jun. 5, 2003

(65) Prior Publication Data
US 2004/0030723 A1    Feb. 12, 2004

(30) Foreign Application Priority Data
Jun. 5, 2002    (EP)    ................................... 02012530

(51) Int. Cl.
  G06F 7/00    (2006.01)
  G06F 17/00    (2006.01)
  G06F 17/30    (2006.01)
(52) U.S. Cl. ........................................ 707/7; 707/104.1
(58) Field of Classification Search .................... 707/7, 707/104.1, 100
See application file for complete search history.

(56) References Cited

U.S. PATENT DOCUMENTS

| | | | |
|---|---|---|---|
| 6,233,575 B1 * | 5/2001 | Agrawal et al. ................ | 707/6 |
| 6,389,436 B1 * | 5/2002 | Chakrabarti et al. ......... | 715/513 |
| 6,446,061 B1 * | 9/2002 | Doerre et al. ................... | 707/3 |
| 2003/0033263 A1 * | 2/2003 | Cleary .......................... | 706/12 |
| 2005/0114829 A1 * | 5/2005 | Robin et al. ................. | 717/101 |

OTHER PUBLICATIONS

Apte, et al. Automated Learning of Decision Rules for text Categorization, ACM Transactions on Information Systems, vol. 12, No. 3, Jul. 1994, pp. 233-251.*
Sebastian, Fabrizio. Machine Learning in Automated Text Catagorization, ACM Computing Survays, vol. 34, No. 1, Mar. 2002, pp. 1-47.*

* cited by examiner

Primary Examiner—Sam Rimell
Assistant Examiner—Cory Bell
(74) Attorney, Agent, or Firm—Richard Goldman (57) ABSTRACT

A computerized method and system of document analysis. The method and system categorise documents according to a taxonomy. This is accomplished by rating training documents on a lower level by associating either of the following predicates to a training document: either correct, inbound, outbound, or unassigned, Rating categories are established on a lower level by determining precision/recall values for each category, and generating higher level category rating attributes from the lower-level rating steps. This is done by associating one or more of: aa) weak category, bb) existing source/sink relationship between categories, cc) close categories to the categories, and deriving an overall quality measure for the training base from the lower-level and higher-level rating step. The lower-level and higher-level evaluation results are stored. The quality measure is used to determine action proposals to improve the training base as either one or more of: aa) modifying the number of categories by adding a new category or deleting an existing category, or bb) splitting a category in one or more new categories, or cc) merging a category with another one, or dd) modifying the number of training documents of a category by adding or removing some of them, and optionally, providing a means to automatically carry out the above steps and review the results including the ability to restore the previous state.

12 Claims, 3 Drawing Sheets

(A) 'WEAK' CATEGORY C1

(B) 'SOURCE/SINK' RELATIONS (C) 'CLOSE' CATEGORIES

FIG. 3

AUTOMATIC EVALUATION OF CATEGORIZATION SYSTEM QUALITY

FIELD OF THE INVENTION

The present invention relates to computerized method and system of document analysis. In particular, it relates to a method and system for evaluating the quality of a training base comprising a taxonomy consisting of a plurality of categories and a set of training documents assigned to respective ones of the categories, in which method the training base is usable for categorizing documents according to the taxonomy.

BACKGROUND

With modern advances in computer technology, modem speeds and network and Internet technology, vast amounts of information have become readily available in homes, businesses and educational and government institutions throughout the world. Many people rely on computer-accessible information on a daily bases. This global popularity has further increased the demand for even greater amounts of computer-accessible information. However, as the total amount of accessible information increases, the ability to locate specific items of information within the totality becomes increasingly more difficult.

Common practices for managing such information complexity on the Internet or in database structures typically involve some ordering structure comprising a plurality of topics to which the information is assigned in order to be easily located by a user. Such ordering structure might be for example hierarchically or linearly (or other) structured.

Such topic ordering structures are referred to herein as "taxonomies". Such taxonomies can provide a means for designing vastly enhanced searching, browsing, and filtering systems querying with respect to a specific topic can be more reliable than depending only on the presence or absence of specific words in documents, because the danger in querying or filtering by keywords alone is, that there may be many aspects to, and often different interpretations of the keywords, and many of these aspects and interpretations are irrelevant to the subject matter that the searcher intended to find.

Thus, prior art categorization systems are important in order to put a single document or a piece of information into the "box" where it belongs to and where a user expects it to find.

Categorization systems need to be 'trained' by providing sets of typical documents, referred herein as training documents, for each category before they can be used to assign categories to documents. Some systems allow a training document to belong to different categories. In the following, we use the term 'training base' to refer to a taxonomy and its set of training documents.

A well-established prior art method to measure the quality of categorization systems is to calculate 'precision' and 'recall' values that represent the degree to which documents from a test set with category information are assigned to the appropriate categories by the system. This test set is typically established by splitting the set of training documents for each category into a new training set and a test set according to a fixed proportion (for example 80% training, 20% test). Calculating precision and recall values is done by counting how many documents from the test set are assigned to the categories to which they belong and how many cannot be assigned to a category by the system. By doing this iteratively with different randomly selected documents the method's independence from the actual choice of documents and thus the quality of the measurement can be improved.

The following definitions of 'precision' and 'recall' are used:

Precision(c)=Number of documents assigned to category c which belong to c/Number of all documents assigned to c Recall(c)=Number of documents assigned to category c which belong to c/Number of documents belonging to c, whereby "assigned to category c" means an assignment as it results from applying the categorizer, whereas "belonging to category c" refers to a pre-assignment which is assumed in here to be available for all training documents independent from the application of the categorizer. The latter is usually done manually.

In the following we use the term 'training base' to refer to the taxonomy and the sets of training documents per category.

Though precision and recall can be used to provide an overall assessment of the quality of the output of a categorization system, they provide only very limited information about where "problematic categories or training documents" reside within the training base, and how they could be improved.

Problematic categories are assumed in here to be basically those category constellations and training documents causing a negative effect on the training process and correspondingly decreases the quality of the output of a categorization system.

An example for such prior art categorization system is disclosed in U.S. Pat. No. 6,233,575. A precision/recall feedback is used therein to yield a feedback of the categorization system. The present invention is applicable for any categorization system of this type.

Since taxonomies tend to be of dynamic nature as they typically need adaptation to varying business environments, it is important to note that neither creating a taxonomy nor evaluating the quality of a categorization scheme is a step that only needs to be performed once. Instead, this must be revised often in practice. Since categorization systems use a mathematical model to map documents to categories that is learned in the training step, a change of a taxonomy may have a significant impact on the overall quality of the categorization system, even if the change seemed to affect only a small part of the taxonomy. Thus, categorization systems must be checked for quality after such a modification. Thus, it is desired to do that job without major operation of humans, as each human interaction is error-prone and—due to its monotony—a laborious work.

Though a precision/recall-based feedback about the quality of a categorization system may help to see, if the result of the training phase may be useful or not, this prior art approach provides only very restrictive information about which areas of the taxonomy should be improved if the result of the training phase is not deemed useful.

OBJECT OF THE INVENTION

It is thus an objective of the present invention to provide a method for evaluating the training base of categorization systems that helps to improve the quality of their classification.

SUMMARY OF THE INVENTION

This objective of the invention is achieved by the features stated in enclosed independent claims. Further advantageous arrangements and embodiments of the invention are set forth in the respective subclaims. Reference should now be made to the appended claims.

Summarizing the most important aspects of the invention a computerized method is disclosed for evaluating the training base used by a categorization system. Basically, it is characterized by the steps of:

a) Rating training documents on a lower level by associating either of the following predicates to a training document:
correct, inbound, outbound, unassigned,
b) Rating categories on a lower level by determining precision/recall values for each category,
c) Generating higher level category rating attributes from the lower-level rating steps, by associating one or more of:
aa) weak category,
bb) existing source/sink relationship between categories,
cc) close categories
to the categories,
d) deriving an overall quality measure for the training base from the from the higher-level and lower-level rating step,
e) determining action proposals to improve the training base as either one or more of:
aa) modifying the number of categories by adding a new category or deleting an existing category, or
bb) splitting a category in one or more new categories, or
cc) merging a category with another one, or
dd) modifying the number of training documents of a category by adding or removing some of them.

With a "categorization system" the present invention refers to a computerized method to assign predefined categories to "units of information" such as: text documents, graphical information like pictures and video, and audio information. The categories are the in here to be organized as a 'taxonomy'. A taxonomy applicable for the present invention can have any degree of structure ranging from an unordered set to a hierarchically organized.

In order to assign categories to a unit of information such categorization systems must be 'trained' on the basis of representative sets of information objects for each category. The taxonomy together with the sets of training objects for each category are called the 'training base' of a categorization run.

A categorization run refers to the application of the given categorizer to a document using a specific training base. The result of such a categorization run can be a single category or a collection of categories. If it is a collection it can either be an unordered set or, more typically, a list ordered according to a confidence measure that represents the degree to which the document fits within the category at issue. The inventive principle proposed in here is applicable to all three types of categorization results.

A document may have multiple origins and/or multiple targets. As an example, consider the two categories 'Sports' and 'Politics' and a document that describes activities of the government to support a nation's athletes. On the one hand, this document may be an appropriate training document for both categories. On the other hand, chances are that a categorizer will return both categories as a result.

The inventive approach deals with this as follows: if a test document d in category c exists in a plurality of n categories, either in the training or in the test set, the maximum number of categories returned by the categorizer is limited to n. These n categories form the orgin set O. The categorization may yield a set of result categories T. If c is in T, c is used as the target. If T contains other categories of O, target will be set to the category found in both, O and T with the highest confidence value. If T does not contain any categories of O, target will be set to the category with the highest confidence value in T. Finally, if T is empty, target={ } will be set. As a result, each document is mapped to exactly one target.

The major substeps in a preferred mode of the inventive quality evaluation process are as follows:

1. for each category c of the taxonomy T split the set of training objects into a new training set $T_C$ and a test set $E_C$ according to a fixed ratio (for example 80%/20%). It should be noted that it is preferred to split the set such that the whole process can be iterated with new test sets that have no objects in common with the previous iteration (for a 80%/20% distribution there can for example be up to 5 such iterations overall);
2. train the categorizer with the new training set;
3. categorize each document in the test set with the obtained training base $<T, T_C>$, compare with the expected result from the pre-assigned categories and compute for each category c of T:
3.1 the set $C_C$ of 'correctly assigned documents' that belong to category c and are assigned to c;
3.2 the set $I_C$ of 'inbound documents' which are documents assigned to c that belong to a category different from c;
3.3 the set $O_C$ of 'outbound documents' which are documents that belong to c but are assigned to a category different from c;
3.4 compute the set $U_C$ of unassigned documents which are the documents that belong to c but are not assigned to any category;
4. the set U of unassigned documents, which is the union of the sets $U_C$ over all categories c of the taxonomy;
5. identify quality criteria for each of the categories apart from precision and recall; in particular:
5.1 identify 'weak categories' for which the following holds:
$(|O_C|+|U_C|)/(|C_C|+|O_C|+|U_C|)>t1$ (threshold value)
whereby $(|C_C|+|O_C|+|U_C|)$ corresponds to the test set $E_c$, i.e., this comprises all documents tested for a category c.
It should be noted that |X| here means the number of elements in X, where X is a set as defined in item 3 with respect to a category c.
5.2 identify 'source/sink relationships' by finding pairs of categories $<c1, c2>$, for which the following holds for predefined threshold values $t_1$ (e.g. 50%), $t_2$ (e.g. 70%):
If more than $t_1$ test objects that belong to category c1 are elements of $O_{c1}$, and more than $t_2$ of those test objects are assigned to category c2, then there is a source/sink relationship between c1 and c2, where c1 is the source, and c2 is the sink;
5.3 identify 'close categories' for which the following holds:
c1 and c2 are close categories, if there are source sink relations $<c1, c2>$ and $<c2, c1>$. It should be noted that the thresholds $t_1$, $t_2$ used when identifying close categories may be different than the thresholds for identifying source/sink relations, e.g., t1=30% and t2=70%.
6. based on the measures from 5, visualize the taxonomy by highlighting problematic areas, e.g. groups of categories with source/sink relationships, weak categories or training documents that do not fit into a category;

"highlighting" shall be understood to comprise any measure to produce a particular focus of the taxonomy, the visual appearance of which is stressed in a particular way to the user.

7. propose actions to improve the training base (taxonomy and training objects) such as:
7.1 modifying the number of categories by adding a new category or deleting an existing category
7.2 splitting a category in one or more new categories
7.3 merging one or more categories
7.4 modifying the number of training documents of a category by adding or removing some;
8. provide a means to automatically carry out these actions and review the results including the ability to restore the previous state.

To improve the quality of the result, steps 1-3 can be repeated to cover each document from the original training set, e.g. using a 80%/20% split, steps 1-3 are performed iteratively whereby the contents of sets $C_C$, $I_C$, $O_C$, and $U_C$ are accumulated for all categories c using five pairs <test set, new training set> so that no two test sets have a document in common but all training documents are part of a test set in one of these runs.

When further the documents to be categorized essentially consist of text documents, the method covers the currently most important field of application.

When further, the method comprises the steps of:
a) modifying the training base according to one or more of the action proposals, and
b) iteratively reentering into a new evaluation run with the modified training base, the advantage results that the categorizing scheme might be improved fully automatically by the computer without human interaction.

When the inventional method further comprises the step of presenting the evaluation results in a graph-like form, the advantage results that in particular with large categorization schemes and/or large number of categories a quick overview can be obtained over its basic qualities and deficiencies. Moreover, established graph analysis can be used to visualize the possible effect of changes to the taxonomy and to identify problematic areas of the taxonomy.

When further comprising the step of issuing action proposals in a preview form to the user, the preview comprising an effect which can be obtained from a user-effected setting of particular, desired categorization input parameters, this increases the user comfort as a potential modification of the categorization scheme as provided within a hint may be thought about before being entered into the a next evaluation step.

It should be added that the lower-level and higher-level evaluation result of an evaluation run are stored at least temporarily in order to display them, and/or to enable for a restore when undoing changes to the training base.

The present invention provides a more flexible mechanism than available in prior art that allows evaluating the taxonomy, training documents and categorization system on different levels of granularity.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 1:
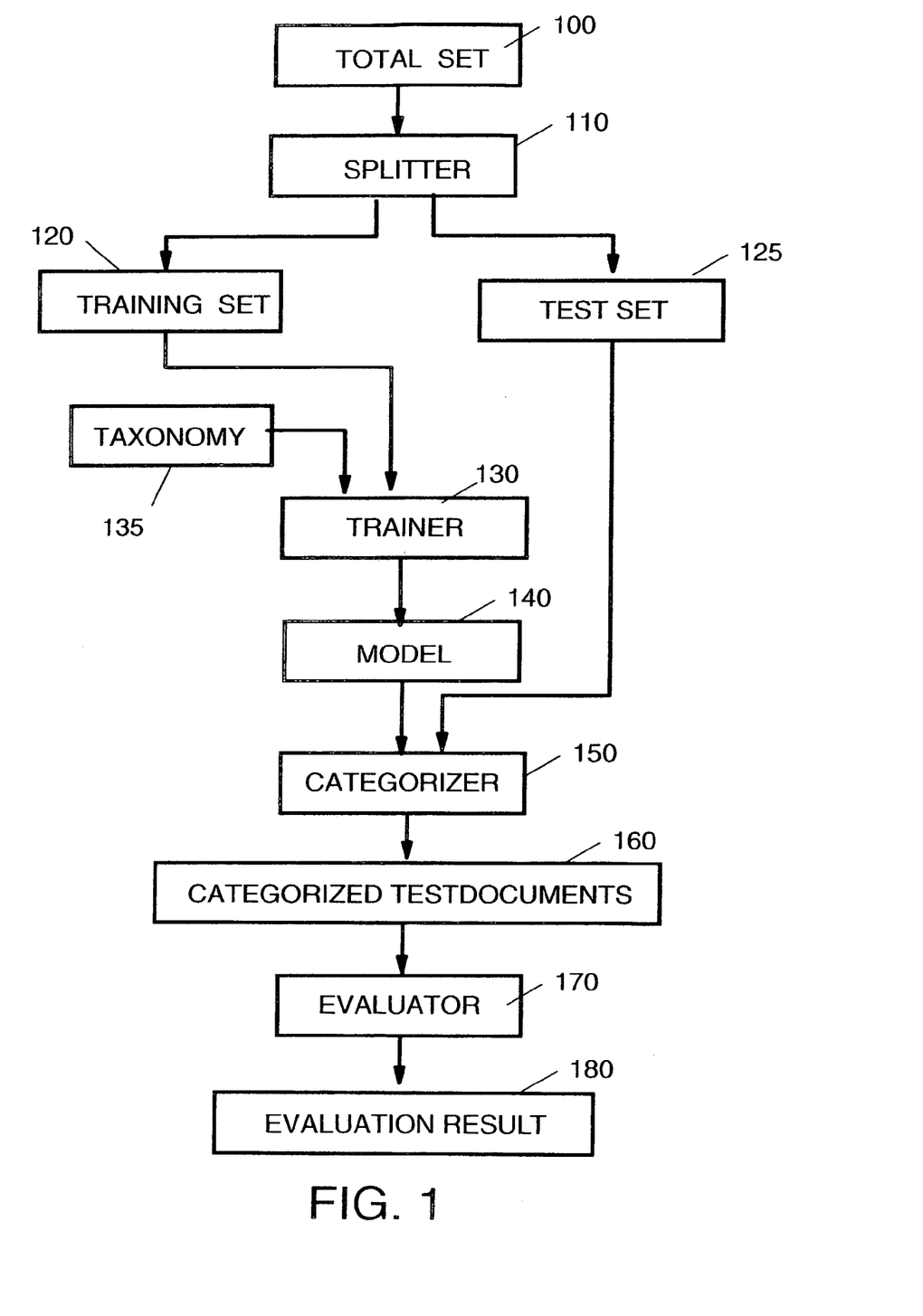
FIG. 1 is a schematic block diagram illustrating the basic components forming part of the Evaluation Algorithm according to a preferred embodiment of the present invention.

With general reference to the figures and with special reference now to FIG. 1 an evaluation of the training system according to a preferred embodiment of the present invention is shown. The basic input required for the evaluation is considered as comprising a total set 100 of documents, which is split up by a Splitter 110 into a training set 120 and a test set 125 of documents, and a given taxonomy 135 comprising a plurality of categories c. It is to be understood that the Procedure between block 100 and block 125 is done for each category c.

Thus, as reveals from the drawing, the evaluation starting point is a total set 100 of training documents provided for each category in the taxonomy 135. A correct categorization of those documents into the particular category is thus known in advance.

For each category, the splitter module 110 of the inventive system splits up the total set 100, assumed to comprise a number of 400 documents (10 categories holding 40 documents) into two disjoint subsets, namely a training set 120 comprising preferably a larger number of documents, and a test set 125 with a smaller number, preferably with a ratio 80%, 20%.

Thus, when the sample taxonomy is assumed to comprise a number of 10 categories, 10 different training sets are provided. The training set for each category and the taxonomy 135 form the training base.

A categorizer trainer program module 130 builds a categorization model 140, based on the training base. The model 140 comprises the plurality of rules saying how a document is categorized, as this is usually done in prior art. A prior art categorizer module 150 is provided for applying those rules and classifying (categorizing) the documents according to the given taxonomy 135.

Based on the categorization model 140, the test set 125 is input into the categorizer module 150 which classifies the documents in the test set 125 into categorized text documents 160.

For each document in the test set, an inventive evaluator module 170 compares the categories assigned by the categorizer module 150 with the actual category/ies to which the document is known in advance to belong to. The details relevant were already specified above, see items 3. to 5., in the SUMMARY section above for reference.

Based on this comparison, each document in the test set is evaluated as either 'correct', 'inbound', 'outbound' or 'unassigned' depending on membership in the respective sets $C_C$, $I_C$, $O_C$, and $U_C$. This is understood in here as a lower-level rating of the training documents.

On the same lower-level the categories are rated by prior art precision and recall values as defined above.

According to the invention, a higher-level rating is added which uses the lower-level evaluation results. All such further evaluations as:

rating categories with rating attributes such as weak, or close to another category, and identifying source/sink relationships between at least two categories, are based on above given lower level evaluation of the documents in the test set. All results are stored, summarized in the 'evaluation result' 180.

Such higher-level evaluation is performed preferably according to the description given in item 5., in above SUMMARY section. More details are given below and are illustrated with reference to FIG. 3.

Figure 3:
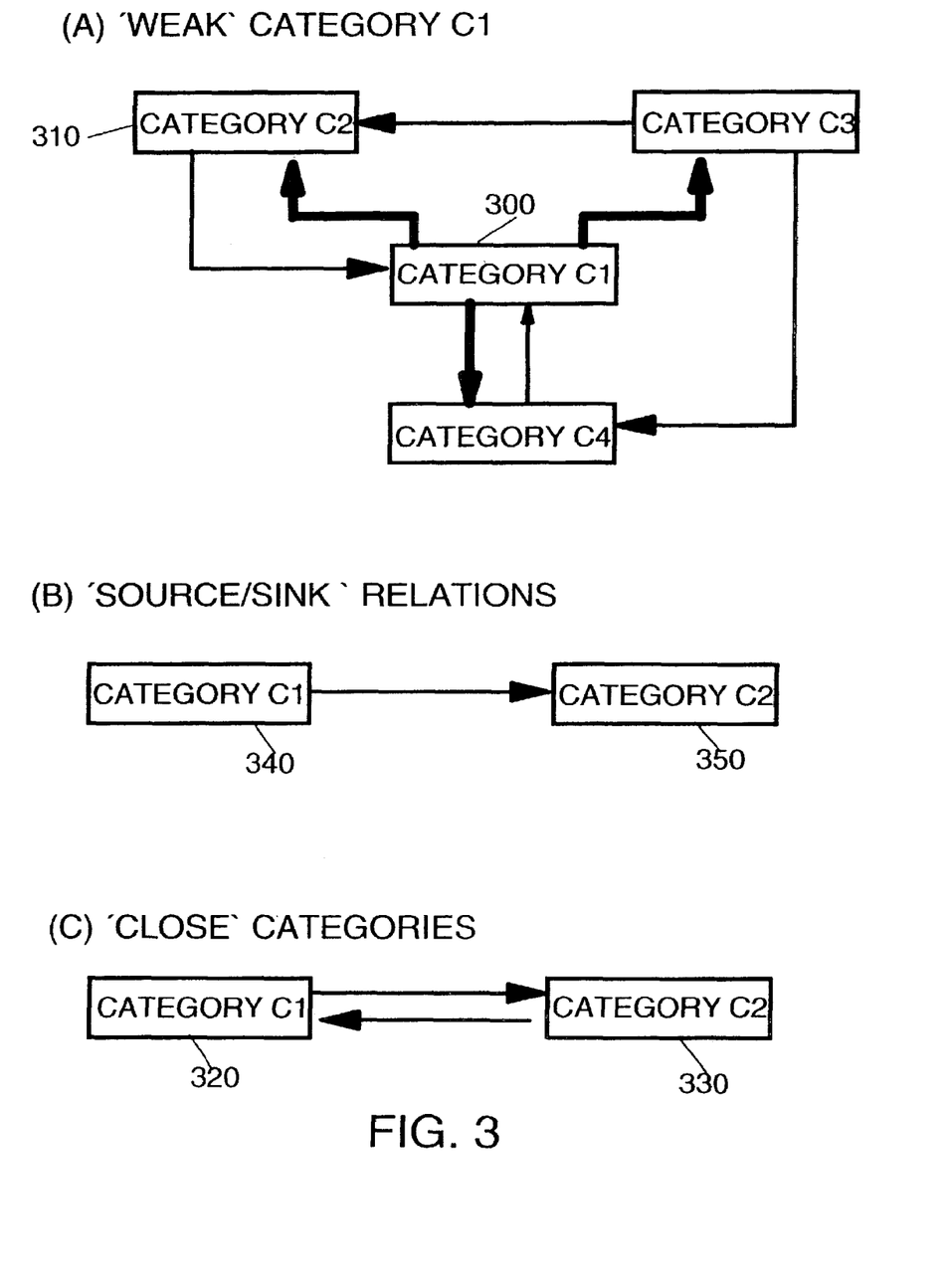
FIG. 3 is a block diagram illustrating schematically the higher-level evaluation results according to a preferred embodiment of the present invention.

With reference to FIG. 3 three distinct situations (A), (B), and (C) are depicted.

The rectangle-shaped boxes represent categories. Links between boxes represent source/sink relationships depicted as pointing from the source category to the sink category, whereby the width of the arrow represents the strength of the relationship in terms of the number of documents that show the underlying behavior.

In case (A) in the top portion of the drawing a sample visualization of a weak category c1 300 is given. Category c1 300 is rated as a weak category, since a large number of documents known to belong to c1 in advance are assigned to other categories like c2 310 or category c4 by the categorizer module 150 using the current training base.

A 'weak category' c is determined as defined earlier above:
$(|O_C|+|U_C|)/(|C_C|+|O_C|+|U_C|) > t1$ (threshold value)
whereby $(|C_C|+|O_C|+|U_C|)$ corresponds to $E_C$, i.e., this comprises all documents tested for a category c.

Of course, a different selection of t1, as e.g., 80% may also be useful from case to case. Thus, a weak category looses a considerable fraction of the documents originally associated with by pre-assignment as mentioned above.

In case (B) a special case of case (A) is depicted, i.e., a 'source/sink relationship' between a fixed pair of categories c1 340 and c2 350 in which category c1 looses a considerable fraction of documents to precisely the one different category c2.

Thus, pairs of categories <c1, c2> are identified, for which the following holds when applying predefined threshold values $t_1$ (e.g. 50%), $t_2$ (e.g. 70%):

If more than $t_1$ test objects that belong to category c1, are elements of $O_C$, and more than $t_2$ of those test objects are assigned to category c2, then there is a source/sink relationship between c1 and c2, where c1 is the source and c2 is the sink; Thus, category c1 is a weak category which looses a major part of documents to category c2. T1 and t2 are basically independent from each other.

In case (C) 'close' categories c1 320, and c2 330 are depicted with balanced document "flow" between them. For each of the close categories a threshold value is defined as in case (A), above. c1 and c2 are close categories, if there are source/sink relations <c1, c2> and <c2, c1>.

It should be noted that the thresholds $t_1$, $t_2$ should be basically equal in size for identifying close categories.

Thus, category c1 looses some documents to category c2 and vice versa. Also more than two categories may build up a 'close' relationship between themselves, e.g., a cluster of 3 categories, with t1, t2 t3 being basically equal in size.

It should be noted that the thresholds $t_1$, $t_2$ used when identifying close categories may be different than the thresholds for identifying source/sink relations, e.g., t1=30% and t2=70%.

According to a preferred embodiment of the invention the higher-level evaluation results obtained with reference to FIG. 3 can be preferably graphically represented to the user. The taxonomy can thus be visualized and the focus can be set to "problematic areas", such as illustrated in FIG. 3, e.g., by highlighting respective groups of categories with source/sink relationships, weak categories or—additionally by marking training documents that do not fit into a given category.

Figure 2:
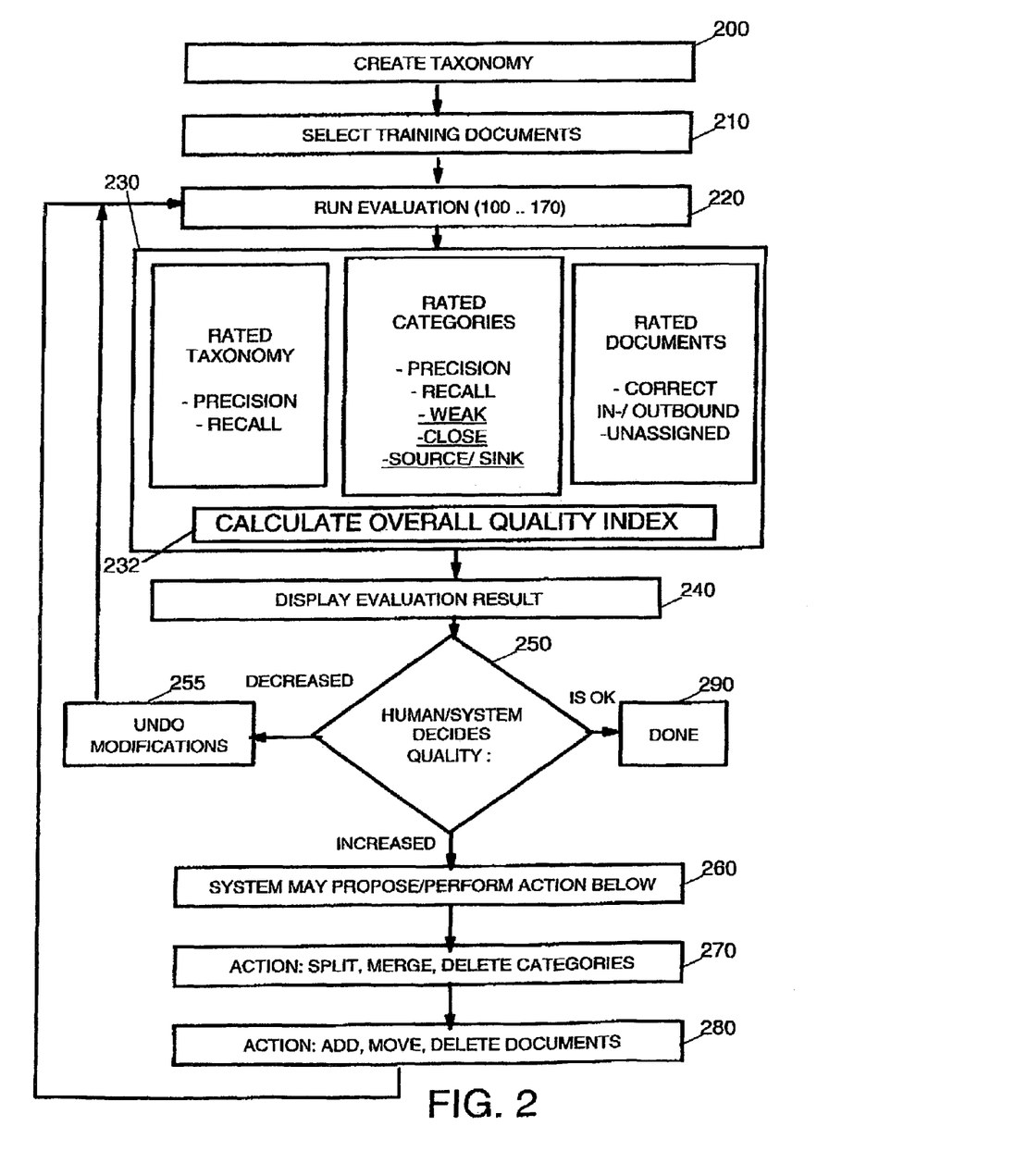
FIG. 2 is a schematic block diagram illustrating the control flow of the process of evaluation and refinement of the training base of a preferred embodiment of the inventional method in an overview form.

With additional reference to FIG. 2 further preferred aspects of the inventional method are described in more detail. They are best understood in context with the overview representation in FIG. 2, as they comprise additional steps embedding the inventional evaluation core.

In a step 200 the underlying taxonomy is created or imported into the inventive evaluation program module. Then, the training documents are selected in a step 210, preferred per category, and it is entered separately for each category into the evaluation procedure 220, which was described before with reference to FIG. 1. Thus, the steps 200 and 210 can be considered as preparational steps that may depend on the categorizer at issue and are not a particular subject to the present invention.

According to a preferred embodiment, a presentation of the evaluation result is provided to the user at three levels as depicted in blocks 230, 240:

a) an evaluation result concerning the taxonomy as a whole, which is based on precision and recall values, preferably;

b) an evaluation result concerning the individual categories, comprising lower-level and focussing higher level results, as mentioned before at the description of FIG. 1 and FIG. 3;

c) an evaluation of the training documents, which is preferably based on the lower-level criteria "correct", "inbound", "outbound", and "unassigned".

To prepare for a subsequent decision 250, on how to proceed further with the inventional training base evaluation, preferably, an overall quality index for the total training base is computed, step 232, by using one or a combination of the following criteria:

i. Overall precision/recall for the taxonomy (mean over all categories;

ii. Minimum precision/recall over all categories;

iii. Minimum of $|C_C|/|E_C|$, $|O_C|/|E_C|$ or $|U_C|/|E_C|$ over all categories c;

iv. presence or absence of categories with attributes like 'weak' etc.

The selection of criteria i. to iv. is best to be done on a case to case base driven by the underlying taxonomy and commercial background.

After running the evaluation 220 as described above with reference to FIGS. 1 and 3, the evaluation results are displayed as mentioned shortly above, step 240, in a graphical form including weighted graph representations as mentioned earlier.

It should be added that, in case of a first iteration it should be checked if the quality index is acceptable. This can be concluded by deciding if individual values are above or below, respectively, a respective predefined threshold value.

If it is not the first iteration, the values of the quality index is compared with the one computed from the previous run. Then it can be proceeded depending on the result of the comparison 250:

In case of a quality decline it is proposed to perform an UNDO of the preceding changes of the training base, see step 255.

In case the quality goal is met, it is proposed to keep training base unchanged 290.

In case of a quality improvement, which is not yet sufficient to meet the predefined quality goal of the training base, changes to the training base are proposed, the so-called action proposals, step 260, whereby an option is preferably provided to perform all or some of them automatically, step

260. Details on the computation of proposed actions as depicted in boxes 270, and 280, like splitting, merging or deleting categories, or adding, deleting training documents, or moving a training document from one category to another one, are given further below.

If the training base has changed, a new evaluation run is necessary to gauge the effects of the changes. Thus it is branched back to step 220.

The computation of proposed changes is preferably performed on a category level and on a training document level.

On category level, the following is proposed:

i. For close categories c1, c2 it is proposed to merge them to a new category "c1_and_c2" and to join the respective training sets.

ii. If there is a strong source/sink relation from category c1 to category c2, it is proposed to split c2 into two categories c2 and "c2_with_some_c1" where the training set of "c2 _with_some_c1" is the set of all documents that belong to c1 but are assigned to c2.

iii. For weak categories c1 with a relatively small number of correctly assigned objects (i.e., $|C_{C1}|/|E_{C1}|$ below a given threshold value) it is proposed to delete the category.

On the level of training objects, the following is proposed:

i. For documents in U+O it is proposed to delete or replace them (automatic application would imply deletion).

Furthermore, in addition to the above disclosure, the following top-down approach for improving the training base is proposed according to the present invention:

Using the inventive measures at the taxonomy level to decide whether the training base still needs improvement. In experiments underlying to the present invention, the changing the training base was stopped when precision and recall values around 90% were attained.

Using the inventive measures at the category level to identify the problematic categories. The problems may either be caused by the taxonomy or by individual training documents. It turned out useful to concentrate on the weak categories first, since changing them tends to improve categories they lose documents to as well.

As a next step, source/sink relations and close categories should be examined. Another focal point are categories with high unassigned and/or high outbound values in the low-level evaluation.

Using the inventive measures at document level to identify whether the problems of a category are caused by structural problems of the taxonomy or by training documents that don't fit into the category.

For 'weak categories', deleting the category may be an option, especially when the taxonomy is in its initial stages of development. The corresponding topic may be captured by the categories the outbound documents were assigned to, or the unassigned documents suggest the introduction of a new topic. If the category should be kept, the actions to battle 'high unassigned' and 'high outbound' values stated below are applicable.

For 'source/sink relations', both source and sink must be analyzed. On a taxonomy level, one possible choice here is merging the categories into one, if they don't act as source or sink for many other categories. Moreover, splitting the sink into (sub)categories can help if the category is too general, i.e. it acts as sink for several categories. A category that is a source to many other categories may already be marked as a weak category. If not, its training document set must be examined for differences between the correct and the outbound documents.

Merging 'close categories' is a choice easy to understand. However, this may result in a category that is too general, a possible sink in future evaluations. If the categories provide two different views of a domain concept, keeping them separate may be feasible if users adhere to either one view or the other. Close categories may also serve as a hint that both fail to catch the distinctive concepts of the domain. Introducing new categories may thus be appropriate.

At the document level, unassigned, inbound and outbound documents should be compared with the correct documents for 'origin' (and for 'target', in the case of inbound documents). Aspects to consider here are 'topic', 'size' and 'style'. As an example for a topic mismatch, consider a category 'politics' with training documents in two groups, either dealing with parties or focussing on elections. The trainer may pick features of only one group, and the documents of the other end up as unassigned or outbound. If documents are significantly larger or smaller than the correct ones, they may include too much noise or too little features to be categorized correctly. Splitting or merging these documents can be helpful.

The typical way to deal with an unassigned document is to delete it.

If a category has a 'high outbound' or 'inbound' value, the appropriate action depends on whether the category loses documents to many categories vs. to only one or two. If the former is true, it may serve as a hint that the category is not distinctive enough. New, better suited training documents or a different taxonomy structure may be needed. In the latter case, moving the documents to 'target' should be considered.

The following section illustrates with a sample evaluation, how the inventive evaluation methods help to identify the problematic areas in a taxonomy. In the example given below, we a subset of the Reuters2178 collection is used, available via Internet at "www.research.att.com/lewis", and comprised of 10 categories with approximately 40 training documents each.

For the sake of the example, the original category coffee is split into two categories coffee and coffeebean, each containing a disjoint subset of training documents taken from coffee.

All evaluation runs were done with 5 iterations, covering the whole document set. Treshold values
T_{weak}=0.75,
T_{source}=0.5 and
T_{sink}=0.7 are used.

For close categories,
T_{source}=0.3 and
T_{sink}=0.7 is used.

The initial evaluation yielded a precision of 0.54 and a recall of 0.52 on the taxonomy level. Using the information of subsequent evaluations, precision could be increased to 0.96 and recall to 0.92. The following table depicts the initial evaluation result at the category level (bold values represent high ratings).

| Category | # inbound | # correct | # unass. | # outbound | predicate |
|---|---|---|---|---|---|
| Cocoa | 6 | 34 | 1 | 5 | |
| Coffee | 11 | 22 | 6 | 12 | Close |
| Coffeebean | 9 | 18 | 9 | 13 | Close |
| Wheat | 21 | 13 | 7 | 23 | Weak |
| Corn | 22 | 11 | 11 | 20 | Weak |
| Grain | 35 | 3 | 3 | 34 | Weak |
| Soybean | 7 | 19 | 3 | 28 | Weak |
| Cotton | 21 | 33 | 0 | 5 | |
| Rice | 12 | 27 | 1 | 7 | |
| Sugar | 7 | 28 | 3 | 9 | |

Analysis of grain showed that both, inbound and outbound documents came from many other categories, namely 6 and 5, respectively. Additionally, the training documents in grain indicated that the category was too general and didn't fit into the taxonomy scheme. Deleting the category and re-running the evaluation increased precision to 0.64 and recall to 0.57.

While some categories (e.g. coffee) could sharpen their profile due to less outbound documents, the categories wheat, corn and soybean remain weak. Analysis of the outbound and unassigned training documents for these categories showed mainly three causes:

Some documents contained features of several categories, e.g. "Jamaica buys PL-480 corn", "wheat and rice.txt". Those were either split up into distinctive parts and added to the categories or were deleted. Others were assigned to the wrong categories in the reference collection, e.g. "Argentine maize, soybean forcasts fall.txt" was found in corn. These documents were reassigned to the right category.

Moreover, there were documents that differed in topic from the rest of the documents, e.g. "Zambia, IMF talks stall on food subsidies.txt", found in corn. These documents were deleted. After these changes were made, precision and recall rose to 0.86 and 0.79, respectively.

Further, the close categories coffee and coffeebean were focussed.

A large part of the outbound documents for coffee are assigned to coffeebean, and vice versa. After analyzing the training documents, these two categories are merged.

As a result, a final evaluation yields an overall precision of 0.96 and an overall recall of 0.92. The following table depicts the final evaluation result at the category level.

| Category | # inbound | # correct | # unass. | # outbound | predicate |
|---|---|---|---|---|---|
| Cocoa | 3 | 32 | 1 | 4 | |
| Coffee | 4 | 61 | 3 | 4 | |
| Wheat | 1 | 24 | 0 | 0 | |
| Corn | 0 | 7 | 0 | 2 | |
| Soybean | 2 | 16 | 1 | 0 | |
| Cotton | 1 | 32 | 0 | 0 | |
| Rice | 0 | 19 | 1 | 1 | |
| Sugar | 0 | 32 | 2 | 0 | |

Next, the preferred representation of evaluation resulting in a graph-like form is described in more detail.

According to the invention, the motivation for such graph-like representation is as follows:

In a medium or large categorization scheme, the results of the evaluation should be presented to the user in a way that allows to quickly locating the above-mentioned "problematic areas" of the taxonomy. This is based on the following knowledge:

A change in one category, e.g. changing the set of training documents or splitting up the category, can affect other categories as well, sometimes even the whole taxonomy. Thus, a kind of coupling exists between categories.

For an effective improvement of the taxonomy that spans multiple steps, the user should be able to see the categories that may be affected when changing a category. Less coupling typically means more productive optimization of the taxonomy. If changes made to the training base have only local influences, different people can concentrate on optimizing different parts of the taxonomy, and subsequent maintenance of the taxonomy (e.g. adding more categories) becomes easier. Therefore, the "hotspots" of the categorization scheme that increase its coupling should be identified as early as possible in the process of evaluating and changing a taxonomy.

Presenting the results of the evaluation in a graph-like form has the following goals:

a) An easier identification of those parts of the categorization scheme that increase its coupling significantly. These parts should be tackled first during a taxonomy scheme optimization.

b) Visualization of the possible effects of a change in the categorization scheme.

c) Visualization of the evaluation result in general.

These goals are achieved by the following inventive features:

For the identification of coupling hotspots and visualization of change effects, a weighted, undirected graph defined is proposed according to the invention, defined as follows:

For a given taxonomy T and an Evaluation Result ER, an evaluation graph G=(V, E) is defined with V={Category c|c is in T} and E={(e1, e2)|e1≠e2, c1 represents a category c1, e2 represents a category c2, a training document d1 exists in c1, and ER assigns d1 to c2}.

The weight w of an edge e∈E is the amount of training documents assigned from c1 to c2 and vice versa, i.e. the amounts are added together.

It is proposed to use the transitivity of the evaluation graph for both, the identification of coupling hotspots, and the visualization of change effects:

A node v or edge e in G is a "Coupling Hotspot", or a "problematic area" of the taxonomy, if it increases the transitivity of G significantly. That is, the difference of the transitivity measure between G and a Graph G' where v or e are removed, exceeds a predetermined threshold t. The transitivity itself can be computed using one of the established prior art methods for weighted, undirected graphs.

For the visualization of the effects of changing a category c, it is proposed to use the transitive closure of the corresponding node v in G. In a dense graph, computing it up to a user-defined depth may be appropriate.

According to a specific aspect of the invention it is proposed not to include the unassigned documents of a category into the graph representation, as the changes required to reduce this number are typically local to this category and do not affect the coupling of the taxonomy as a whole. Above representation can be augmented by a special node "unassigned", and the definition of E can change accordingly. However, using simple graph transitivity becomes unfeasible then, as many nodes may be connected via the "unassigned" node. This node should then be seen as a "transitivity sink", so that no path in the graph may exist where the "unassigned" node is anywhere, except the end.

For the visualization of the general evaluation result, it is proposed to use a weighted, directed graph defined as follows:

For a given taxonomy T and an evaluation result ER, an evaluation graph is defined as:

G=(V, E) with

V={Category c|c is in T}∪{node "unassigned"}

E={(e1, e2)|e1 represents a category c1, e2 represents a category c2 or the "unassigned" node and there exists a training document d1 in e1 and ER assigns d1 to e2}

The weight w of an edge e∈E is the amount of training documents assigned from e1 to e2.

The special node "unassigned" is introduced according to a specific aspect of the present invention in order to visualize the unassigned training documents of the evaluation result. Moreover, correctly assigned documents are represented as edges pointing back to their respective node. To improve readability of the result graph, the following filter methods may be applied:

Masking certain edges or nodes; when nodes are masked this results in that all edges to/from that node are masked as well, Masking certain edge types, in particular all edges representing correct documents, Collapsing several nodes into a single node, Fish-eye views concentrating on subgraphs.

Established prior art graph layout algorithms may be employed for the visualization, most notably force-directed methods, such as spring layout.

It should be noted that most actions that change the training base as e.g., merging or deleting categories, moving documents can also be applied via the graph representation itself.

It should be understood that the documents used in training set 120 and test set 125 are not limited to consist of text in any desired language, but instead, they may also essentially consist of graphical information, for example from photographs, paintings or even from videos. Thus, the inventional concept is open to process nearly all kind of information desired, as long as the information itself comprises distinct features which are theoretically able to be categorised into any given topic list, i.e., taxonomy. Thus, for example photograph documents can be categorised into categories like Photo comprises landscape, Photo comprises a human being, Photo shows some animal, Photo shows a building, etc.

Of course, other criteria are also possible. Or, alternatively, a video stream can be analyzed, and pictures of it may be extracted and subjected to the categorizing method, in an analogous form as described with the photographs, above.

Or, a video stream can be analyzed, and the audio data thereof may be extracted to yield a subset of the audio stream, which comprises a human conversation, for example. In this case the conversation can be further extracted to yield the single words the persons are telling each other. Thus, in the end, a text document can result of a number of various steps, performed before the actual categorization can take place.

As should reveal from the above description, according to a specific feature of the present invention a given taxonomy 135 is not forcedly restricted to remain unmodified during the inventional evaluation method. For example, the inventional method may begin with a first, given taxonomy having categories c1 to c7, whereas the inventional method after some iterations may end up with a modified taxonomy of 11 categories, c1, . . . c11.

Other modifications not explicitly mentioned so far surely exist and may be added to the inventive concept. Further, the features of the subclaims may be vastly applied independently of each other.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

While the invention has been described with respect to certain preferred exemplifications and embodiments, it is not intended to limit the scope of protection thereby, but solely by the claims appended hereto.

The invention claimed is:

1. A computerized method for evaluating the quality of a training base comprising a taxonomy comprising a plurality of categories and a set of training documents, in which method the training base is usable for categorizing the set of training documents according to the taxonomy, the method being characterized by the steps of:
   a. rating training documents of the set of training documents on a lower level by associating one of the predicates: correct, inbound, outbound, unassigned, to a training document,
   b. rating the categories on a lower level by determining precision/recall values for each category,
   c. generating higher level category rating attributes from lower-level rating attributes, by associating to the categories one or more of:
      aa) weak category,
      bb) existing source/sink relationship between the categories,
      cc) close categories,
   d. deriving an overall quality measure for the training base from the higher-level and lower-level rating attributes,
   e. determining action proposals to improve the training base including one or more of the following operations on the categories:
      aa) modifying the number of categories by adding a new category or deleting an existing category, or
      bb) splitting a category in one or more new categories, or
      cc) merging a category with another category, or
      dd) modifying the number of training documents of a category by adding or removing training documents; and
   f. modifying the training base according to one or more of the action proposals.

2. The method according to claim 1, in which the training documents are pre-assigned to the categories in which they belong, and the evaluation is done per category.

3. The method according to claim 1, further comprising the step of:
   generating a representation of the evaluation result comprising highlighted problematic areas in the taxonomy.

4. Method for evaluating the quality of a training base comprising a taxonomy comprising a plurality of categories and a set of training documents, in which method the training base is usable for categorizing the set of training documents according to the taxonomy, comprising the steps of:
  a. rating training documents of the set of training documents on a lower level by associating one of the predicates: correct, inbound, outbound, unassigned, to a training document;
  b. rating the categories on a lower level by determining precision/recall values for each category,
  c. generating higher level category rating attributes from lower-level rating attributes, by associating to the categories one or more of:
    aa) weak category,
    bb) existing source/sink relationship between the categories,
    cc) close categories,
  d. deriving an overall quality measure for the training base from the higher-level and lower-level rating attributes,
  e. determining action proposals to improve the training base including one or more of the following operations on the categories:
    aa) modifying the number of categories by adding a new category or deleting an existing category, or
    bb) splitting a category in one or more new categories, or
    cc) merging a category with another one category, or
    dd) modifying the number of training documents of a category by adding or removing training documents; and
  f. modifying the training base according to one or more of the action proposals, and
  g. iteratively reentering into a new evaluation with the modified training base.

5. The method according to claim 4, in which the training base is modified automatically, and the new evaluation run is entered automatically.

6. The method according to claim 1, further comprising the step of:
  after issuing a representation of the evaluation result, offering an option to a user to restore a previous state of the training base by undoing action proposals associated with a preceding evaluation run.

7. The method according to claim 1, in which the documents to be categorized consists of text documents.

8. The method according to claim 1, further comprising the step of:
  presenting the evaluation results graphically.

9. The method according to claim 1, further comprising the step of:
  issuing the action proposals in a preview form, the preview comprising an effect which can be obtained from a user-effected setting of particular, desired categorization input parameters.

10. A computer system having means for performing the steps of a method according to claim 1.

11. A computer program product comprising a computer usable medium having computer readable program thereon for execution in a data processing system said computer readable program code comprising portions for performing respective steps of the method according to claim 1.

12. A computer program product stored on a computer usable medium comprising computer readable program means for causing a computer to perform the method of claim 1.

* * * * *